(12) United States Patent
Chen

(10) Patent No.: US 9,419,668 B2
(45) Date of Patent: Aug. 16, 2016

(54) SIZE-ADAPTIVE MOBILE DEVICE COVER

(71) Applicant: BRIGHT HARVEST OVERSEAS INC., Taipei (TW)

(72) Inventor: Szu-Han Chen, Taipei (TW)

(73) Assignee: BRIGHT HARVEST OVERSEAS INC., Taipei (TW)

( * ) Notice: Subject to any disclaimer, the term of this patent is extended or adjusted under 35 U.S.C. 154(b) by 123 days.

(21) Appl. No.: 14/336,394

(22) Filed: Jul. 21, 2014

(65) Prior Publication Data

US 2016/0020807 A1    Jan. 21, 2016

(51) Int. Cl.
*H04M 1/00* (2006.01)
*H04B 1/3888* (2015.01)
*G06F 1/16* (2006.01)
*H04M 1/02* (2006.01)

(52) U.S. Cl.
CPC ............ *H04B 1/3888* (2013.01); *G06F 1/1675* (2013.01); *H04M 1/0206* (2013.01)

(58) Field of Classification Search
CPC ................ G06F 2200/1631; G06F 2200/1633; H04B 1/13888
See application file for complete search history.

(56) References Cited

U.S. PATENT DOCUMENTS

| | | | | |
|---|---|---|---|---|
| 8,634,887 B2 * | 1/2014 | Hu | ........................ | G06F 1/1628 455/575.8 |
| 8,672,199 B1 * | 3/2014 | Ditore | ................... | G06F 1/1632 224/411 |
| 8,915,361 B2 * | 12/2014 | Rayner | ................. | G06F 1/1601 206/320 |
| 8,960,421 B1 * | 2/2015 | Diebel | .................. | G06F 1/1679 206/320 |
| 8,985,333 B1 * | 3/2015 | Clementi | ............... | A45C 11/00 206/476 |
| 9,128,683 B2 * | 9/2015 | Wong | ........................ | G06F 1/20 |
| 2008/0096620 A1 * | 4/2008 | Lee | ........................ | G06F 1/1626 455/575.8 |
| 2012/0181195 A1 * | 7/2012 | Lu | .......................... | A45C 11/00 206/320 |
| 2013/0114198 A1 * | 5/2013 | Gengler | ................. | B65D 25/00 361/679.08 |
| 2014/0054909 A1 * | 2/2014 | Kannaka | ................. | A45F 5/102 294/137 |
| 2015/0053583 A1 * | 2/2015 | McCormick | ........... | A45C 11/00 206/521 |

FOREIGN PATENT DOCUMENTS

| | | |
|---|---|---|
| TW | M466542 | 8/2013 |
| TW | M463857 | 10/2013 |

OTHER PUBLICATIONS

English Abstract of TW M463857.
English Abstract of TW M466542.

* cited by examiner

*Primary Examiner* — Wesley Kim
*Assistant Examiner* — Richard Chan
(74) *Attorney, Agent, or Firm* — WPAT, P.C., Intellectual Property Attorneys; Anthony King

(57) ABSTRACT

A size-adaptive mobile device cover comprises: multiple cover panels, each of the cover panels connected to at least another one of the cover panels, one of the cover panels having a side surface and a first attaching portion mounted on the side surface of the panel; at least one first edge holder secured on the side surface of the panel that has the first attaching portion, each of the at least one first edge holder having a retaining recess; and multiple corner holders disposed opposite to the at least one first edge holder, each of the corner holders having a second attaching portion, and the second attaching portion detachably attached to the first attaching portion. Accordingly, the size-adaptive mobile device cover is not only applicable to mobile devices of various sizes, but also has low production cost and is convenient for use.

12 Claims, 4 Drawing Sheets

SIZE-ADAPTIVE MOBILE DEVICE COVER

BACKGROUND OF THE INVENTION

1. Field of the Invention

The present invention relates to a size-adaptive mobile device cover; especially relates to a size-adaptive mobile device cover that is applicable to mobile devices of different sizes.

2. Description of the Prior Art(s)

Mobile devices, such as tablet personal computers (PC) and large-sized smart phones, have become quite common, such that a variety of accessory products for the devices are made available on the market to meet people's need. Tablet personal computers are provided in a variety of sizes; for instance, the Nexus 7 of Google Co. is 7 inches and the Aspire P3 of Acer Co. is 11.6 inches.

As the mobile devices are costly, protective jackets are provided to protect the mobile devices from collision, scratch, wear, etc. The mobile devices are put into the protective jackets to be protected. The protective jacket comprises two covering plates. Each of the covering plates has four corners. Each corner of the covering plate has one elastic bond. Each corner of the mobile device is fixed by a respective one of the elastic bonds.

In addition to the conventional protective jacket mentioned above, TW M463857 provides a multi-function hand-held device for tablet PC. The purpose of the multifunctional hand-held device is to enable the user to hold a tablet computer by one single hand, or the tablet computer can be directly erected on the desk in a hands-free manner. The multifunctional hands-held device comprises two tablet computer fixing frames, a gripping frame assembly, and a support frame; a main frame is arranged on the periphery of the gripping frame assembly, the tablet computer fixing frames and the support frame are movable and are fixed onto the main frame of the gripping frame assembly by the aid of knobs; a tablet computer is fixed and clamped by more than two hooks of each tablet computer fixing frame; a rotating portion is arranged in a central area of the main frame and can automatically rotate clockwise and anticlockwise, and a movable grip is arranged on the rotating portion, so that a user can hold the grip by one single hand; the user can directly have the tablet computer erected on a desk in a hands-free manner by the aid of the support frame.

However, to avoid collision, scratch, and wear of the mobile devices by fixing the mobile devices in the conventional cover mentioned above, the size of the cover and the size of the mobile devices have to be matched. As the mobile devices are provided in different sizes, the manufacturer has to fabricate covers of different sizes for the mobile devices of different sizes, such that production cost is inevitably increased.

Besides, although the tablet computer fixing frames of the multifunctional hand-held device are capable of clamping and fixing the mobile devices of different sizes, the multifunctional hand-held device has a complicated structure and a high production cost. Hence, the multifunctional hand-held device is not economic for manufacturers. Also, even the mobile devices are clamped and fixed by the multifunctional hand-held device, the mobile devices are exposed and are not shielded. The mobile devices are prone to collision, scratch, and wear; further, the mobile devices are also likely to slip out from the multifunctional hand-held device.

The conventional technique fails to provide a size-adaptive mobile device cover that not only provides good protections for mobile devices of different sizes, but also has low production cost for manufacturers and is convenient for users.

To overcome the shortcomings, the present invention provides a mobile device protective cover to mitigate or obviate the aforementioned problems.

SUMMARY OF THE INVENTION

The objective of the present invention is to provide a size-adaptive mobile device cover, which not only provides good protections for mobile devices of different sizes, but also reduces production cost for manufacturers and is convenient for users.

The size-adaptive mobile device cover in accordance with the present invention comprises multiple cover panels, at least one first edge holder, and multiple corner holders. Each of the cover panels is connected to at least another one of the cover panels. One of the cover panels has a side surface and a first attaching portion mounted on the side surface of said cover panel. Each of the at least one first edge holder is secured on the side surface of the cover panel that has the first attaching portion. Each of the at least one first edge holder has a retaining recess. The corner holders are disposed opposite to the at least one first edge holder. Each of the corner holders has a second attaching portion, and the second attaching portion is detachably attached to the first attaching portion.

After a side of a mobile device is retained in the retaining recess of each of the at least one first edge holder, the corner holders are located at two corners of the opposite sides of the mobile device to hold the corners of the mobile device and secure the mobile device on the cover panel that has the first attaching portion, so as to keep the mobile device in the size-adaptive mobile device cover and protect the mobile from collision, scratch, and wear. In addition, since the corner holders are detachably attached to the first attaching portion by the second attaching portion, locations of the corner holders on the first attaching portion are adjustable corresponding to the sizes of mobile devices; hence, the size-adaptive mobile device cover is applicable to mobile devices of various sizes. Also, the size-adaptive mobile device cover has a simple structure, is convenience to carry, has low production cost for manufacturers, and is convenient for users.

Other objectives, advantages, and novel features of the invention will become more apparent from the following detailed description when taken in conjunction with the accompanying drawings.

DETAILED DESCRIPTION OF THE PREFERRED EMBODIMENTS

Figure 1:
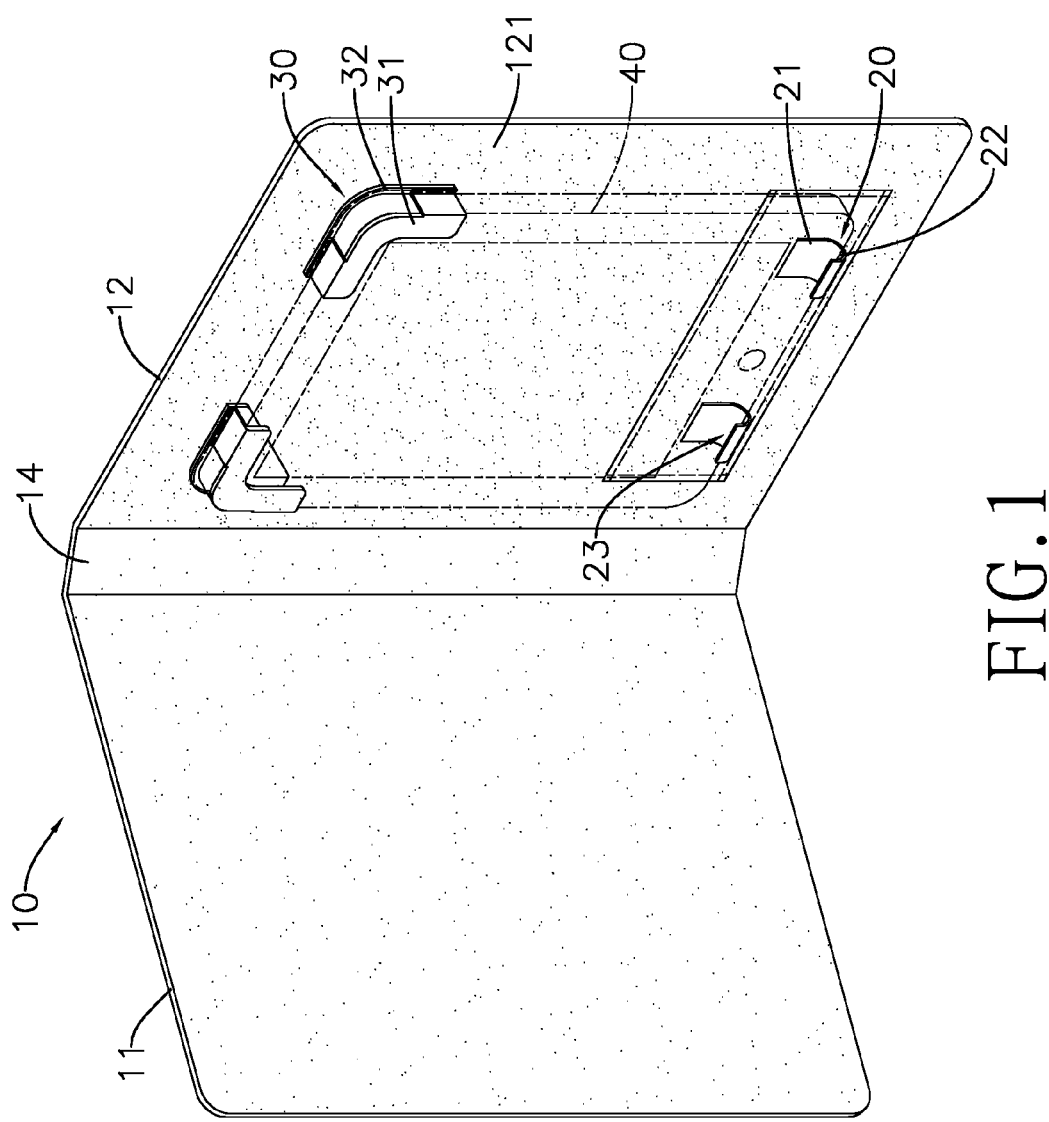
FIG. 1 is a schematic view of a first embodiment of a size-adaptive mobile device cover in accordance with the present invention.

With reference to FIG. 1, a first embodiment of a size-adaptive mobile device cover 10 in accordance with the present invention has multiple cover panels, at least one first edge holder 20, and multiple corner holders 30. Each of the cover panels is a parallelogram and has a thickness. Each of the cover panels is connected to at least another one of the cover panels via a back panel 14.

In the present embodiment, the size-adaptive mobile device cover 10 has two cover panels, two first edge holders 20 and two corner holders 30. Said two cover panels are a first cover panel 11 and a second cover panel 12. The first cover panel 11 and the second cover panel 12 are rectangular. An inner edge of the first cover panel 11 and an inner edge of the second cover panel 12 are connected via the back panel 14, such that the first cover panel 11 and the second cover panel 12 can be open and closed relative to each other. The second cover panel 12 has an inner surface, an outer surface corresponding in position to the inner surface of the second cover panel 12, and a first attaching portion 121 mounted on the inner surface of the second cover panel 12. The first edge holders 20 are secured on the inner surface of the second cover panel 12. The corner holders 30 are detachably attached to the first attaching portion 121. The first edge holders 20 and the corner holders 30 serve to hold a mobile device 40, such as a tablet PC, a relatively large smart phone, and the like, on the first attaching portion 121.

Each of the first edge holders 20 has a connecting section 21, a supporting section 22, and a retaining recess 23. The connecting section 21 of each of the first edge holders 20 takes a form of sheet and is secured on the first attaching portion 121. The supporting section 22 of each of the first edge holders 20 is connected with the connecting section 21 and takes a U-shaped form in a lateral view. The retaining recess 23 of each of the first edge holders 20 is formed between the supporting section 22 and the connecting section 21. Accordingly, each of the first edge holders 20 is secured on the first attaching portion 121 of the second cover panel 12 by the connecting section 21. A side of the mobile device 40 is retained in the retaining recess 23 of each of the first edge holders 20 and supported by the supporting section 22 of each of the first edge holders 20. Also, the corner holders 30 are disposed opposite to the first edge holders 20. As the first edge holders 20 are located at a side of the mobile device 40, the corner holders 30 are located at two corners of the opposite sides of the mobile device 40 to hold the corners of the mobile device 40 and secure the mobile device 40 on the second cover panel 12. The first cover panel 11 is turned to adjoin the second cover panel 12, such that the mobile device 40 is held between the first cover panel 11 and the second cover panel 12 and can be protected against collision, scratch, and wear.

In the present embodiment, the two first edge holders 20 are parallel secured on the first attaching portion 121 of the second cover panel 12 to retain a side of the mobile device 40 in the retaining recess 23 of each of the first edge holders 20, such that the supporting strength to the side of the mobile device 40 is enhanced.

Figure 2:
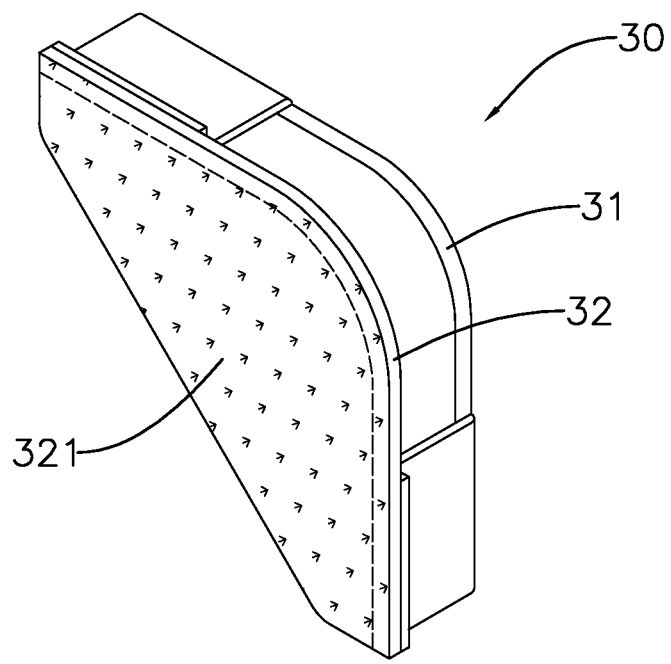
FIG. 2 is a perspective view of a corner holder of the size-adaptive mobile device cover in FIG. 1.

With reference to FIG. 2, each of the corner holders 30 has a first holding section 31, a second holding section 32, and a holding slot 33. The first holding section 31 is strip-shaped. The second holding section 32 is plate-shaped. The first holding section 31 and the second holding section 32 are disposed apart from each other. The holding slot 33 is angular and is formed between the first holding section 31 and the second holding section 32. A corner of the mobile device 40 can be inserted into the holding slot 33. In addition, the second holding section 32 has a second attaching portion 321 mounted on an outer surface of the second holding section 32. The second attaching portion 321 and the first attaching portion 121 of the second cover panel 12 match each other, such that the second attaching portion 321 is detachably attached to the first attaching portion 121. Hence, locations of the corner holders 30 on the first attaching portion 121 are adjusted corresponding to the sizes of mobile devices 40.

Also, since the size-adaptive mobile device cover 10 of the present embodiment has a simple structure and is convenient to carry and store, the production cost of the size-adaptive mobile device cover 10 is low and the size-adaptive mobile device cover 10 is convenient for use.

In the present embodiment, the second attaching portion 321 is a hook and loop fastener, a touch fastener or a plastic buckle. The first attaching portion 121 is made of a flannel layer.

Figure 3:
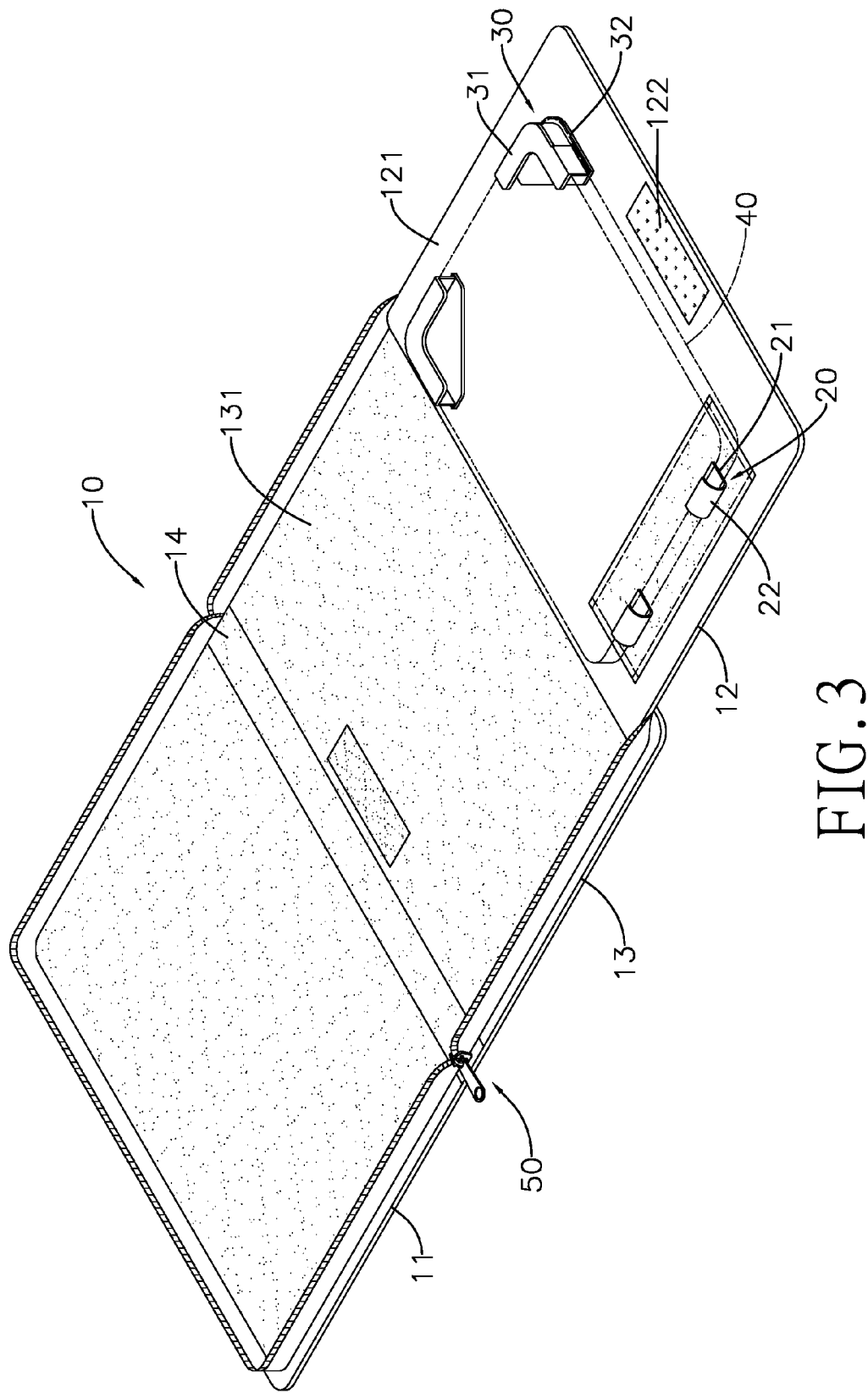
FIG. 3 is a schematic view of a second embodiment of a size-adaptive mobile device cover in accordance with the present invention.

With reference to FIG. 3, a second embodiment of a size-adaptive mobile device cover 10 in accordance with the present invention is substantially the same as the first embodiment except that the size-adaptive mobile device cover 10 of the present embodiment has three cover panels and a zipper 50. The three cover panels are respectively the first cover panel 11, the second cover panel 12, and a third cover panel 13. The third cover panel 13 is connected between the back panel 14 and the second cover panel 12. In detail, the first cover panel 11 has an inner edge and an outer edge connected to the inner edge of the first cover panel 11; the second cover panel 12 has an inner edge and an outer edge connected to the inner edge of the second cover panel 12; the third cover panel 13 has two inner edges and an outer edge connected to the inner edges of the third cover panel 13; the back panel 14 has two inner edge and an outer edge connected to the inner edges of the back panel 14. The inner edges of the back panel 14 are connected to the inner edge of the first cover panel 11 and one of the inner edges of the third cover panel 13. Another one of the inner edges of the third cover panel 13 is connected to the inner edge of the second cover panel 12. The zipper 50 is mounted along the outer edge of the first cover panel 11, the outer edge of the third cover panel 13, and the outer edge of the back panel 14.

As the first cover panel 11 is turned to adjoin the third cover panel 13 and the second cover panel 12 is turned to be located between the first cover panel 11 and the third cover panel 13, the opening between the first cover panel 11 and the third cover panel 13 is closed by the zipper 50, thereby providing a preferable protection for the mobile device 40 held on the second cover panel 12.

In the present embodiment, the third cover panel 13 has an inner surface, an outer surface corresponding in position to the inner surface of the third cover panel 13, and a third attaching portion 131. The third attaching portion 131 is mounted on the inner surface of the third cover panel 13. Also, the second cover panel 12 further has a fourth attaching portion 122 mounted on the inner surface of the second cover panel 12. The fourth attaching portion 122 is detachably attached to the third attaching portion 131. As the second cover panel 12 is turned to adjoin the third cover panel 13 and the fourth attaching portion 122 is attached to the third attaching portion 131, the mobile device 40 held on the second cover panel 12 by the first edge holders 20 and the corner holders 30 is covered between the second cover panel 12 and the third cover panel 13; thereby the mobile device 40 is well protected from collision, scratch, and wear.

In the present embodiment, the fourth attaching portion 122 is a hook and loop fastener, a touch fastener, or a plastic buckle. The third attaching portion 131 is made of a flannel layer.

Hence, after the second cover panel 12 is turned to adjoin the third cover panel 13 and located between the first cover panel 11 and the third cover panel 13, the second cover panel 12 and the mobile device 40 held on the second cover panel 12 are covered by the first cover panel 11 and the third cover panel 13; as such, by zipping up the zipper 50, the mobile device 40 can be kept away from dust and falling off from the size-adaptive mobile device cover 10.

Figure 4:
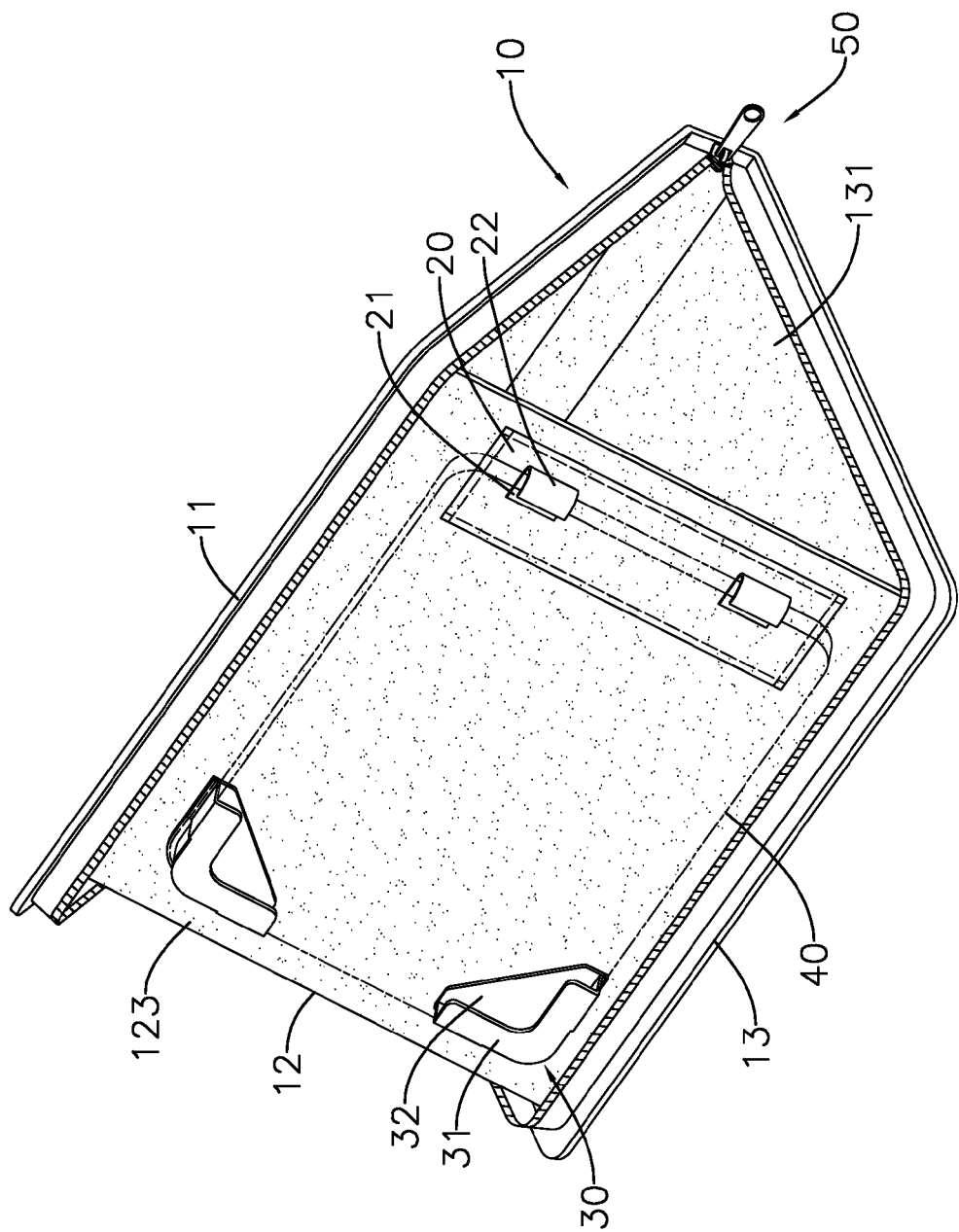
FIG. 4 is a schematic view of a third embodiment of a size-adaptive mobile device cover in accordance with the present invention.

With reference to FIG. 4, a third embodiment of a size-adaptive mobile device cover 10 in accordance with the present invention is substantially the same as the second embodiment except that the size-adaptive mobile device cover 10 of the present embodiment has at least one second side holder 20A, and the second cover panel 12 further has a fifth attaching portion 123. The fifth attaching portion 123 is mounted on the outer surface of the second cover panel 12. The at least one second edge holder 20A is secured on the outer surface of the second cover panel 12.

As shown in FIG. 4, in the present embodiment, the size-adaptive mobile device cover 10 has two second edge holders. Each of the second edge holders 20A has a connecting section 21A, a supporting section 22A, and a retaining recess 23A. The connecting section 21A of each of the second edge holders 20A takes a form of a sheet and is secured on the fifth attaching portion 123. The supporting section 22A of each of the second edge holders 20A is connected with the connecting section 21A and takes a U-shaped form from a side perspective. The retaining recess 23A of each of the second edge holders 20A is formed between the supporting section 22A and the connecting section 21A. In addition, the fifth attaching portion 123 is made of a flannel layer.

FIG. 4 only shows that the corner holders 30 are disposed opposite the second edge holders 20A, and the second attaching portion 321 of each of the corner holders 30 is detachably attached to the fifth attaching portion 123. The second edge holders 20A and the corner holders 30 serve to hold the mobile device 40, such as a tablet PC, a relatively large smart phone, and the like, on the fifth attaching portion 123. However, the corner holders 30 are selectively disposed opposite to the first edge holders and the second edge holders 20A, and the second attaching portion 321 of each of the corner holders 30 is detachably and selectively attached to the first attaching portion and the fifth attaching portion 123. Hence, the mobile device 40, such as a tablet PC, a relatively large smart phone, and the like, can be secured on the first attaching portion or the fifth attaching portion 123, depending on demand.

With reference to FIG. 4, the second cover panel 12 and the first cover panel 11 are turned toward the third cover panel 13 respectively; then, an outer edge of the second cover panel 12 and an outer edge of the first cover panel 11 are secured to each other closely such that the size-adaptive mobile device cover 10 is erected of the present on a plane. Accordingly, the mobile device 40 held on the size-adaptive mobile device cover 10 can stand on the plane in a hands-free mode while in use.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A size-adaptive mobile device cover comprising:
a first cover panel having an inner edge;
a second cover panel having:
an inner edge;
an inner surface;
an outer surface corresponding in position to the inner surface of the second cover panel; and
a first attaching portion mounted on the inner surface of the second cover panel;
at least one first edge holder secured on the inner surface of the second cover panel, each of the at least one first edge holder having:
a connecting section secured on the first attaching portion; and
a supporting section connected with the connection section; and
a retaining recess formed between the supporting section and the connecting section;
multiple corner holders disposed opposite to the at least one first edge holder, each of the corner holders having:
a first holding section and a second holding section disposed apart from each other;
a holding slot formed between the first holding section and the second holding section; and
a second attaching portion mounted on an outer surface of the second holding section, and detachably attached to the first attaching portion;
a back panel connected between the inner edge of the first cover panel and the inner edge of the second cover panel;
a third cover panel connected between the back panel and the second cover panel, and having:
an inner surface;
an outer surface corresponding in position to the inner surface of the second cover panel; and
a third attaching portion mounted on the inner surface of the third cover panel; wherein:
the second cover panel has:
a fourth attaching portion mounted on the inner surface of the second cover panel, and detachably attached to the third attaching portion.

2. The size-adaptive mobile device cover as claimed in claim 1, wherein:
the second cover panel has a fifth attaching portion mounted on the outer surface of the second cover panel;
the mobile device cover further comprise at least one second edge holder secured on the outer surface of the second cover panel, each of the at least one second edge holder having a retaining recess;
the corner holders are selectively disposed opposite to the at least one first edge holder and the at least one second edge holder; and
the second attaching portion of each of the corner holders detachably and selectively attached to the first attaching portion and the fifth attaching portion.

3. The size-adaptive mobile device cover as claimed in claim 2, wherein:
each of the at least one second edge holder has:
a connecting section secured on the fifth attaching portion;
a supporting section connected with the connecting section of each of the at least one second edge holder; and
the retaining recess of each of the at least one second edge holder is formed between the supporting section each of the at least one second edge holder and the connecting section of each of the at least one second edge holder.

4. The size-adaptive mobile device cover as claimed in claim 2, wherein the mobile device cover comprises a zipper mounted along an outer edge of the first cover panel, an outer edge of the third cover panel, and an outer edge of the back panel.

5. The size-adaptive mobile device cover as claimed in claim 2, wherein the mobile device cover comprises:
two first edge holders parallel to each other; and
two second edge holders parallel to each other.

6. The size-adaptive mobile device cover as claimed in claim 2, wherein the fifth attaching portion is made of a flannel layer.

7. The size-adaptive mobile device cover as claimed in claim 1, wherein the mobile device cover comprises a zipper mounted along an outer edge of the first cover panel, an outer edge of the third cover panel, and an outer edge of the back panel.

8. The size-adaptive mobile device cover as claimed in claim 1, wherein the mobile device cover comprises two first edge holders parallel to each other.

9. The size-adaptive mobile device cover as claimed in claim 1, wherein the first attaching portion is made of a flannel layer.

10. The size-adaptive mobile device cover as claimed in claim 1, wherein the second attaching portion of each of the corner holders is a hook and loop fastener, a touch fastener, or a plastic hook.

11. The size-adaptive mobile device cover as claimed in claim 1, wherein the third attaching portion is made of a flannel layer.

12. The size-adaptive mobile device cover as claimed in claim 1, wherein the fourth attaching portion is a hook and loop fastener, a touch fastener, and a plastic hook.

* * * * *